May 7, 1963     D. GIACOSA ET AL     3,088,285
DEVICE FOR VARYING HYDRAULIC PRESSURE
Filed Aug. 30, 1960     9 Sheets-Sheet 1

Fig.1

May 7, 1963  D. GIACOSA ET AL  3,088,285
DEVICE FOR VARYING HYDRAULIC PRESSURE
Filed Aug. 30, 1960  9 Sheets-Sheet 2

May 7, 1963 D. GIACOSA ET AL 3,088,285
DEVICE FOR VARYING HYDRAULIC PRESSURE
Filed Aug. 30, 1960 9 Sheets-Sheet 7

May 7, 1963  D. GIACOSA ET AL  3,088,285
DEVICE FOR VARYING HYDRAULIC PRESSURE
Filed Aug. 30, 1960  9 Sheets-Sheet 9

United States Patent Office 3,088,285
Patented May 7, 1963

3,088,285
DEVICE FOR VARYING HYDRAULIC PRESSURE
Dante Giacosa, Turin, and Philip S. Baldwin, Florence, Italy, assignors, by direct and mesne assignments, to Fiat Societa per Azioni, Turin, Italy
Filed Aug. 30, 1960, Ser. No. 52,808
Claims priority, application Italy Sept. 5, 1959
8 Claims. (Cl. 60—54.6)

This invention relates to a hydraulic pressure ratio changer, adapted for incorporation by a mechanism for transmitting hydraulic pressure between a primary section comprising a source of hydraulic delivery pressure and a secondary section connecting with one point at least at which the hydraulic pressure is utilised as a working pressure, which is more particularly suitable for changing the delivery pressure transmitted by the master cylinder to the wheel brake cylinders in hydraulic braking mechanisms for vehicles.

A previous patent application by applicants, U.S. patent appln. Ser. No. 823,152 now Patent No. 3,007,314 discloses a device of the type referred to in which variation in pressure is effected by causing the hydraulic delivery pressure to act on one of the faces of a two-diameter or compound piston movable within a cylinder the bore of which comprises two sections substantially matching the piston diameters, and by causing the working pressure to act on a face of the piston opposite the face acted upon by the delivery pressure.

The abovementioned known device further provides sealing members adapted to prevent liquid flow between the inner cylinder walls and piston periphery, the said faces on the piston defining within the cylinder a first chamber connected with the section communicating with the abovementioned source of hydraulic pressure, and a second chamber connected with the section communicating with the point at which the hydraulic pressure acts as a working pressure.

The device is moreover provided with a passage for the liquid between the two above-mentioned chambers and a valve adapted to control the liquid flow through the said passage. The valve is arranged and constructed to normally admit of free liquid flow from the first to the second chamber and intercept the said flow when the pressure in the first and second chamber reaches a predetermined value, the valve opening again when the pressure in the said chambers sinks beneath the said predetermined value.

The known device further comprises a reaction spring interposed in the said second chamber between the piston and cylinder, the said spring being mounted under a sufficient initial load to oppose displacement of the piston towards the second chamber till the pressure initially transmitted by the source of pressure to the said first and second chambers reaches the abovementioned predetermined value which, when the device is used in connection with a hydraulic braking mechanism for vehicles, equals at least the pressure required for approach of the brake shoes to the wheel brake drums.

The spring is moreover of a rigidity such as to require an increase in delivery pressure by at least 1 kg./cm. to effect a displacement of the piston and compression of the spring by 1 millimeter during the stage at which interconnection of the first and second chambers is intercepted by the valve.

The previous patent application by applicants referred to above further discloses that with values of the increment factor currently employed in conventional hydraulic brake mechanisms for vehicles, the optimum rigidity factor of the reaction spring $R/A_d$ should range between 10 and 20 kg./ccm., its initial load being such that the intervention pressure equals at least twice the necessary pressure for approach of the brake shoes to the wheel brake drums, the only convenient location for the said reaction spring being within the second chamber also referred to as high pressure chamber in order to distinguish it from the first or low pressure chamber.

The same conclusions also apply to the device according to this application which shall be described in detail hereafter.

The purpose of this invention is to provide a hydraulic pressure ratio changer which is of considerably smaller size and comprises a smaller number of parts, is simpler and less expensive in construction and more reliable in operation as compared with devices presently in use.

A further purpose of this invention is to provide a hdraulic pressure ratio changer which may be employed both for amplifying and reducing the hydraulic delivery pressure, without any material constructional modification other than reversal of the outer connections.

A further purpose of this invention is to provide for correct operation of the device by means independent of the rigidity and initial load of the reaction spring.

According to this invention the above purposes are fulfilled by providing a hydraulic pressure ratio changer of the type referred to, in which the said second or high pressure chamber comprises an annular space axially defined within the cylinder by the annular piston face between the two piston diameters, in which the passage between the first or low pressure chamber and second or high pressure chamber comprises the peripheral clearance between the large diameter piston section and corresponding wall of the cylinder bore, the seal interposed between said large diameter piston section and corresponding wall of the cylinder bore performing the function of a valve controlling the liquid flow through the said passage.

Further characteristic features and advantages of this invention will be clearly understood from the appended description referring by way of example to the accompanying drawings which show embodiments thereof, and wherein.

Throughout the figures corresponding parts are denoted by the same reference numbers.

On the drawings the cylinder 1 (FIGURE 1) comprises two sections $d_1$, $d_2$ differing in bore and is closed at one end by a plug 2 and at its other end by a rubber dust-cap 3.

Figure 1:
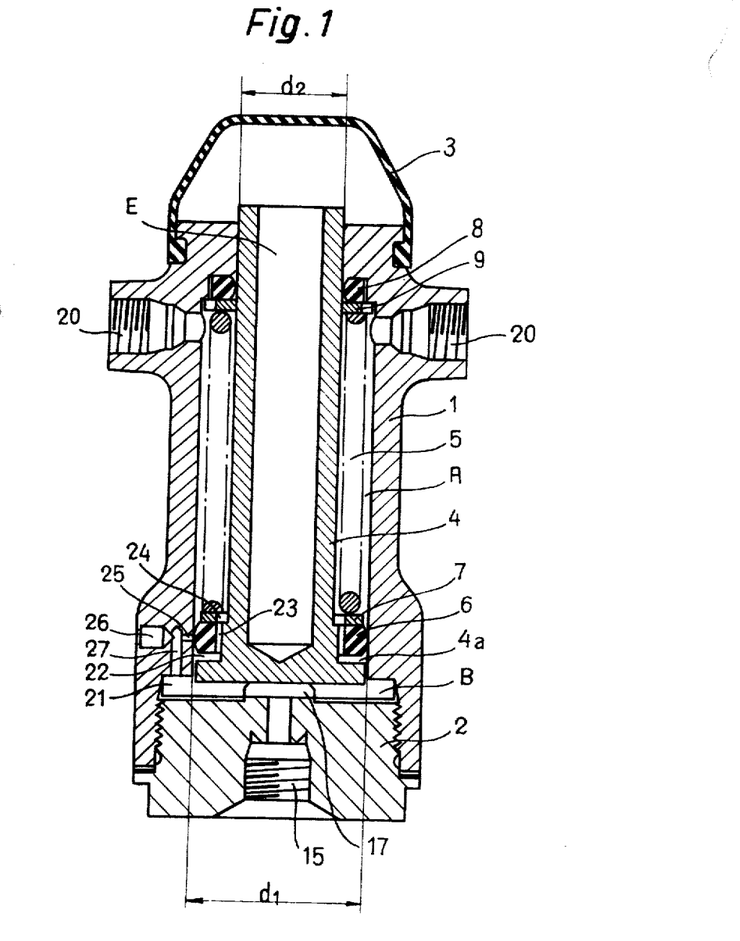
FIGURES 1 to 7 are longitudinal sectional views of seven embodiments of the pressure ratio changer according to this invention.

A compound or two-diameter piston 4 substantially matching in diameters the bores of the cylinder 1 is movable within the cylinder against the action of a reaction spring 5. B denotes the low-pressure chamber connecting with the master cylinder (not shown). An annular space A between the inner wall of the cylinder section of a diameter $d_1$ and the piston section substantially of a diameter $d_2$ acts as a high-pressure chamber connecting with the wheel cylinder (not shown). The piston section which is substantially of a diameter $d_2$ is guided in an axial through hole bored in the wall of the cylinder remote from the plug 2. A chamber E formed by the lightening recess in the compound piston 4 and by the space defined by the dust-cap 2 preferably encloses air at atmospheric pressure.

When the piston 4 moves against the action of the reaction spring 5, the chambers B, A are mutually sealed by a rubber ring 6 held in position by a washer 7 on which the reaction spring bears. The chambers A, E are mutually sealed by a rubber packing ring 8 held in place by a washer 9 by the reaction spring 5. The latter is mounted in the high pressure chamber A under an initial load matching the intervention pressure of the device, the spring bearing at one end on the cylinder 1 through the washer 9 and at its other end on the large diameter section or head portion of the compound piston 4 through the washer 7.

The sealing or packing ring 6 is fitted in a suitable annular space 4a provided at the large diameter section of the compound piston 4 with a certain axial and radial clearance.

The device operates as follows.

During approach of the shoes to the brake drums, oil flows through a tapped inlet hole 15 in the plug 2, connecting through a pipe (not shown) with the master cylinder, and through a transverse cut 17 in the face of the plug 2 adjacent the piston 4, a clearance 21 between the head of the piston 4 and inner wall of the large bore section of the cylinder 1, and passages 22, 23 between the sealing ring 6 and side and bottom walls of the annular space 4a, then reaches through axial cuts 24 in the washer 7 at the intersection of the passage 23 the high-pressure chamber A.

At this stage the oil pressure acts on the sealing ring 6 to press it radially against the inner surface of the cylinder 1, more particularly against the side wall remote from the plug 2 of the annular space 4a, formed by the washer 7 having cuts 24 therein. As the piston 4 starts moving against the action of the spring 5, oil tends to flow from the chamber A to the chamber B, the ring 6 being pushed back against the side wall of the space 4a nearer the plug 2, thereby closing the passage 22 and intercepting interconnection of the two chambers.

The pressure increasing stage is now started. As the piston 4 resumes its initial position on release of the brake pedal the residual pressure $p_1$ in the chamber A prevents restoration of the interconnection of the latter chamber and chamber B through the passage 22.

Oil can nevertheless flow from the chamber A to the chamber B through a narrow radial port 25 closed by a portion of a plug 26, and through an axial hole 27 connecting with the chamber B, both bored in the cylinder wall near the chamber B, to safely draw the shoes apart from the drums.

The radial port 25 is located to connect with the inside of the annular space 4a, hence with the chamber A only when the piston 4 bears against the plug 2, the sealing ring 6 simultaneously bearing against the side wall of the chamber 4a nearer the plug 2.

Figure 2:
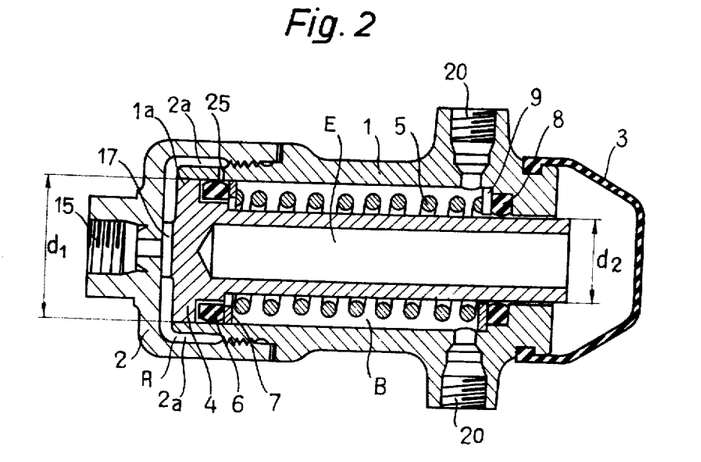

The construction shown in FIGURE 2 is substantially similar to the embodiment just described. The plug 26 and hole 27 can be dispensed with, interconnection of the chambers B and A being effected by the port 25. This is made possible by the fact that the plug is in the form of a cap screwed to the outside of the casing of the cylinder 1 and is formed near its bottom with a portion of an inner diameter exceeding the outer diameter of an end 1a of the cylinder reaching within the cap, thereby creating an annular chamber 2a connecting with the chamber B, which replaces the axial hole 27 in the device according to FIGURE 1.

Figure 3:
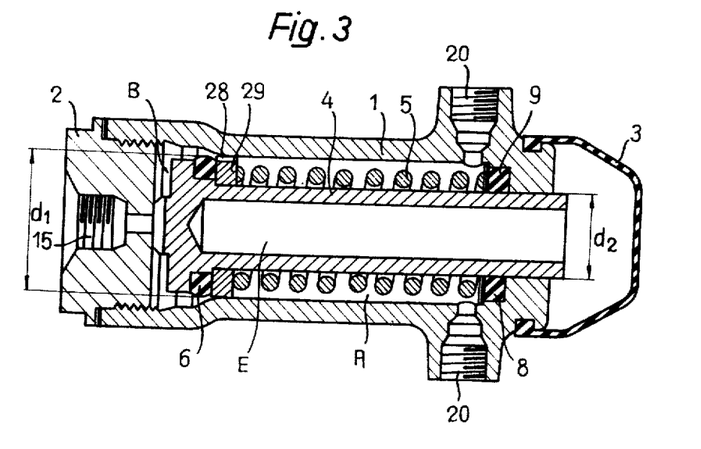

In the embodiment shown in FIGURE 3 the sealing ring 6 is mounted without any clearance in an annular chamber provided in the large diameter portion of the piston 4. When the piston 4 bears on the plug 2, the ring 6 is removed from the cylinder bore of a diameter $d_1$ which joins by a frusto-conical section the inner periphery of the chamber B, the diameter of which is larger than $d_1$. During approach oil can therefore freely flow from the chamber B to the chamber A through the clearance between the ring 6 and cylinder 1 and cuts 28 in the ring 29 centered on the diameter $d_2$ of the piston 4. The ring 29 on which the reaction spring 5 bears, positions the rubber ring 6 and guides the piston 4 over the cylinder section of diameter $d_1$.

When the compound piston 4 starts moving, the ring 6 reaches the cylinder section of diameter $d_1$ which it fits under a slight peripheral pressure, thereby disconnecting the chambers A, B. Similarly to the previous embodiments the piston 4 can now perform its pressure increasing stroke.

Figure 4:
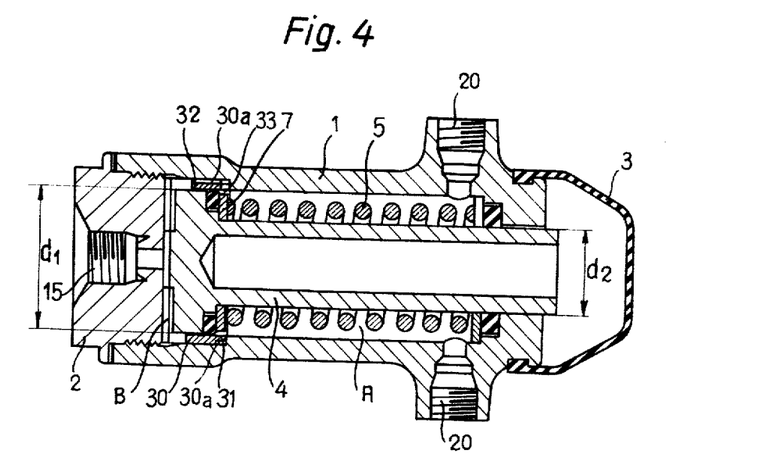

In the embodiment shown in FIGURE 4 a bushing 30 fitted into a cylindrical enlargement of the cylinder section of diameter $d_1$ acts as the end section of the cylinder section of diameter $d_1$ on which the large diameter or head portion of the compound piston 4 slides.

The rubber ring 6 is positioned by the reaction spring 5 through the washer 7 which is mounted with a peripheral clearance with respect to the bore of diameter $d_1$ of the chamber A, and is slightly offset from the radial cuts 31 in the small diameter end of the bushing 30 facing the chamber A, when the compound piston 4 is in its inoperative position in which it rests on the plug 2, whereby the chambers A, B are interconnected. Under these conditions oil can flow from the chamber B through longitudinal cuts 32 in the periphery of the bushing 30 to the annular chamber 30a, through radial cuts 31 and a peripheral clearance 33 between the washer 7 and section of a bore of diameter $d_1$ of the cylinder 1 to the chamber A, thence to the wheel cylinders to draw the shoes towards to the drums.

Communication is intercepted when upon displacement of the compound piston 4 the sealing ring 6 reaches beyond the cuts 31.

Figure 5:
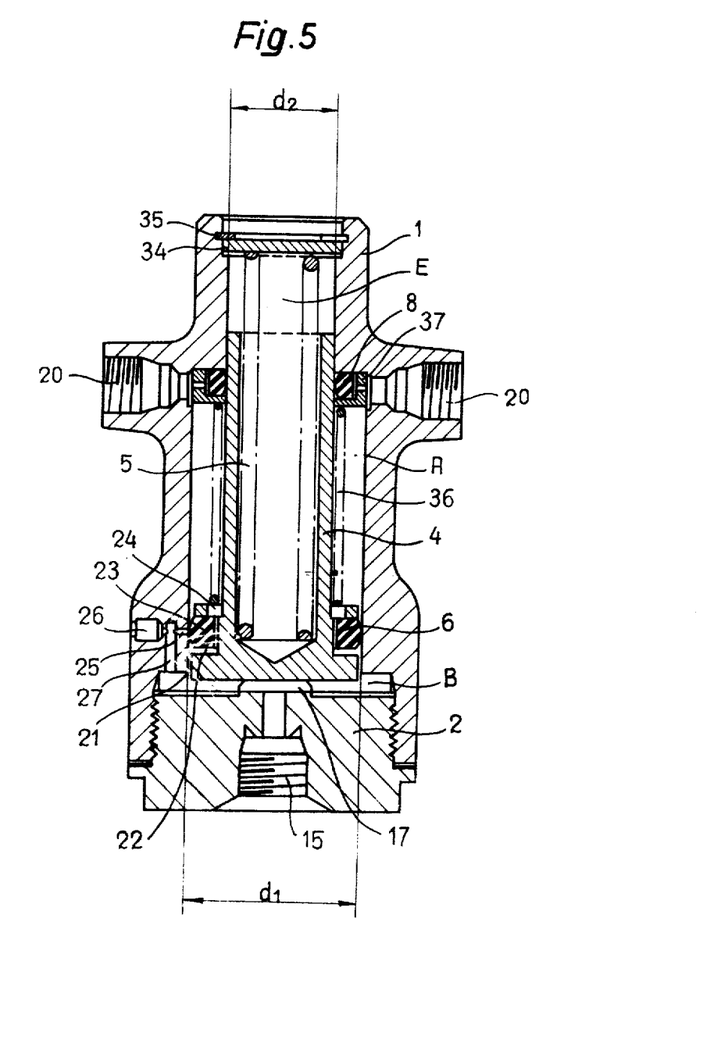

A modification of the device described with reference to FIGURE 1, which can be used in connection with the constructions shown in FIGURES 2, 3 and 4, is shown in FIGURE 5.

As distinct from the previously described embodiment the reaction spring 5 is in part accommodated by the recess in the piston portion of smaller diameter substantially equalling $d_2$ and bears at one end on the bottom of the said recess and at its other end on a plug 34 retained by an expansible ring 35 which closes the end of the cylinder 1 remote from the plug 2.

The spring 36 housed by the high-pressure chamber A in addition to positioning a ring 8 and cup 37 therefor, acts as an additional reaction spring, provided its initial load and rigidity are conveniently selected.

The considerations set out previously apply to the constructions of pressure ratio changer last described in respect of the characteristics of the reaction spring.

The displacement of the compound piston 4 during the approach stage can be delayed, independently of the characteristics of the reaction spring, by substituting for the dust cap 3 a rigid cover and filling the chamber E with liquid, such as oil, the chamber E being connected through a suitable valve with an oil reservoir at atmospheric pressure, which can conveniently be the reservoir for the master cylinder.

Figure 6:
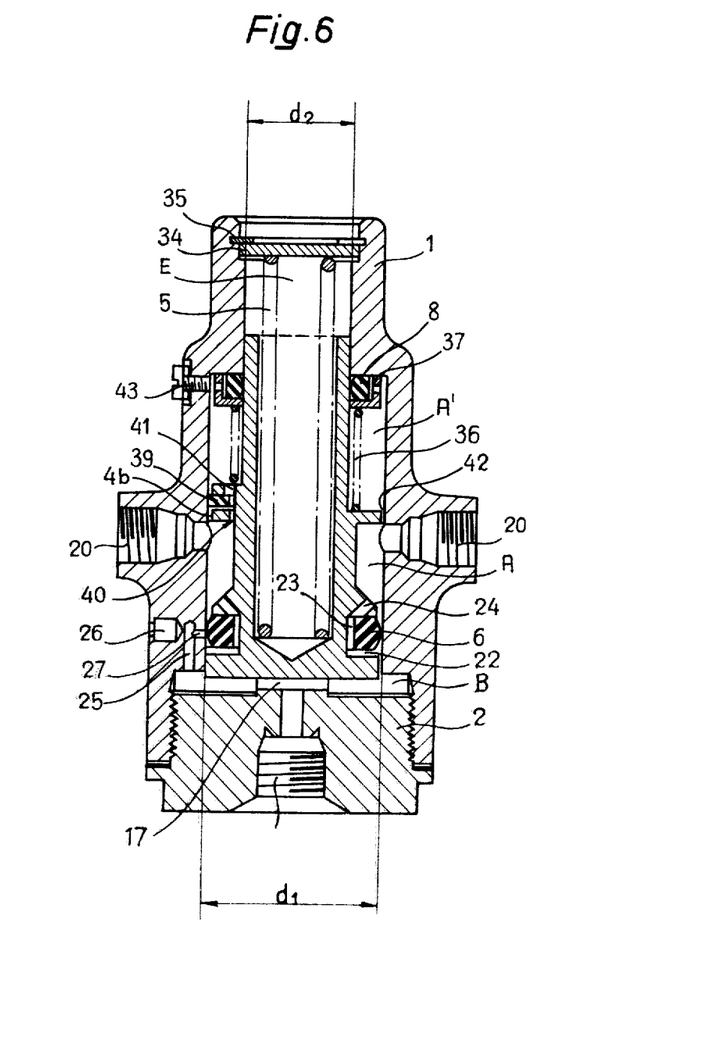

A further method of slowing down motion of the compound piston 4 in the case of rapid approach is indicated in FIGURE 6 which shows a pressure amplifier similar to the construction shown in FIGURE 5.

It will be seen from the drawing that the high-pressure annular chamber is subdivided into a main chamber A and an auxiliary chamber A' formed by providing the piston a certain distance apart from its portion carrying the ring 6 with a flange (4b) the outer diameter of which is just slightly smaller than the diameter $d_1$ of the chamber A (see left portion of FIGURE 6).

The flange has formed therein an annular seat in which a rubber ring 39 is seated with an axial and radial play. The spring 36 bears on the flange 4b and positions through a cap 37 a sealing ring 8 which seals the bore of diameter $d_2$ of the chamber A. The rubber ring 39 seals the bore of diameter $d_1$ when oil tends to flow from the chamber A' to the chamber A, and establishes flow in an opposite direction.

Interconnection of the two chambers is constantly ensured through the orifice 40 and holes 41 cut in the flange 4b. The orifices 40 and holes 41 are so positioned that they cannot in any case be closed by the ring 39. The said orifice and holes connect with the clearance between the periphery of the bore in the ring 39 and the bottom of its respective annular seat.

When the piston 4 starts moving, the oil in the chamber A' is caused to flow to the chamber A exclusively through holes 41 and restriction formed by the orifice 40 because the ring 39 prevents flow through the clearance 42 between the flange 4b and cylinder 1.

This results in a braking action which is more accentuated the higher the rate of displacement of the piston 4. Return of the compound piston 4 is not hindered, for oil can flow back from A to A' through the clearance 42, clearance between the inner periphery of the ring 39 and bottom of its respective seat, and holes 41.

When quick return of the compound piston is not essential, the ring 39 and holes 40, 41 may be dispensed with, the restriction between the chambers A, A' being obtainable through a suitable reduction of the clearance 42 as indicated on the right-hand portion of FIGURE 6.

Drainage of the auxiliary chamber A' can be effected by unscrewing a suitable screw 43.

Figure 7:
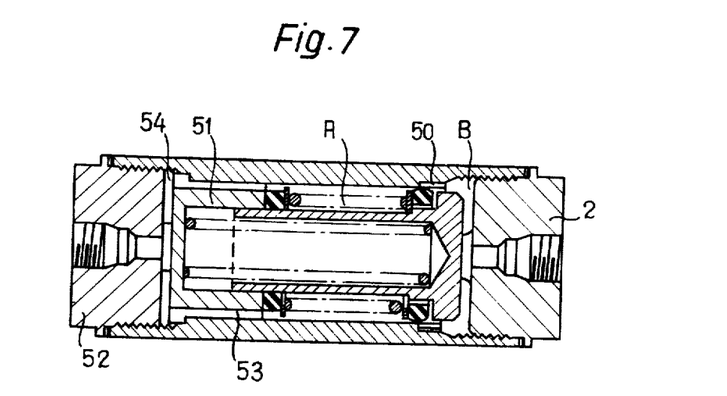

According to the embodiment shown in FIGURE 7 operation of the valve comprising the packing formed by the resilient ring 6 is substantially identical with the operation of the previously described constructions. The only difference resides in the fact that the small diameter section of the compound piston 4 is guided in an axial bore in a tumbler-shaped member 51 inserted into the cylinder through the opening formed in the cylinder end remote from the plug 2 and closed by a plug 52. Similarly to the embodiments shown in FIGURE 5 the reaction spring 5 has still associated therewith an auxiliary spring. The liquid flow from the chamber B to the wheel brake cylinders takes place along the peripheral cuts 53 in the member 51 and radial cuts 54 in the face of the plug 52.

Figure 8:
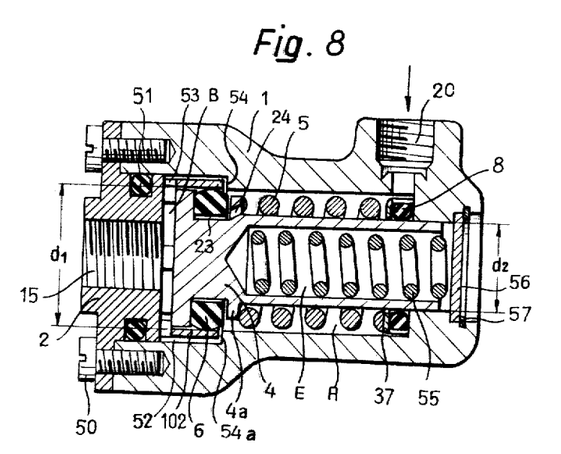
FIGURE 8 is a longitudinal sectional view of the device according to a further modification.

In FIGURE 8, 1 denotes the cylinder having movable therein a compound piston 4, the small diameter portion of which is guided in the bore of a diameter $d_2$ connecting at one end the inside of the cylinder 1 with the outside. The large diameter piston portion or piston head is guided in turn in a cylindrical annular projection 102 of a diameter $d_1$ on the plug 2 closing the bore of the cylinder 1 on the remote side of the hole in which the piston portion of a diameter $d_2$ is guided.

The projection 102 is coaxial with the high pressure chamber A connecting with a threaded nipple 20. B denotes the low pressure chamber connecting with a threaded nipple 15 in the plug 2. The chamber A houses the reaction spring 5 interposed between the shoulder 4a on the compound piston head 4 and a cup 37 acting on a resilient sealing ring 8 to seal the small diameter portion of the piston 4 and the bore in which it is guided.

The head of the compound piston 4 is formed with an annular seating for a resilient sealing ring 6. The outer periphery of the ring 6 of an arcuate cross sectional shape contacts the inner wall of the projection 102 on the plug. The bore of the ring 6 is larger than the diameter of the bottom of the groove seating the ring, the ring thickness being smaller than the axial length of the said groove. The annular clearance 23 between the inner wall of the ring 6 and the bottom of the above-mentioned groove constantly connects with the high pressure chamber A through one or more holes 24 bored in the shoulder 4a on the head of the piston 4 which forms one of the side walls of the groove seating the sealing ring 6.

The plug 2 is secured to the body 1 by means of screws 50 extending through holes bored in a flange 2' on the plug superposed on the face 1' of the cylinder 1. The part of the periphery of the plug 2 entering the cylinder 1 houses in a suitable centering seat a resilient sealing ring 51 preventing escape of oil from the chamber B to the outside.

The outer diameter of the annular projection 102 on the plug is smaller than the inner diameter of its respective seat in the cylinder 1, so that an annular clearance 52 is left between these surfaces and connects with the chamber B through radial cuts 53 in the foot of the projection 102. The bore $d_1$ of the projection 102 accurately matches the bore of the chamber A and somewhat exceeds the diameter of the large diameter section of the piston 4. The length of the projection 102 is so selected that the latter is spaced from the radial shoulder 54 defining on the side opposite the plug 2 the seat for the projection 102, by a length which may be evaluated in a few hundredths of millimeters. The inside of the hole E in the piston 4 houses an auxiliary spring 55. The latter bears on the remote side of the head of the piston 4 on a disc 56 positioned by an expansible ring 57. Springs 5, 55 normally hold the piston 4 pressed against the plug 2. In order to establish in this position free communication between the hole 15 in the plug and the radial cuts 53 the piston 4 is provided on the side of the plug 2 with a cylindrical projection exceeding in diameter the hole 15 but smaller than the bore of the projection 102. The face of the projection on the piston 4 adjacent the plug 2 is formed with two wide grooves extending crosswise.

When the device is adapted to operate as a pressure reducer operation is as follows.

Since the nipples 20 and 15 are connected with the outlet from the master cylinder (not shown) and with the jaw operating cylinders, respectively, fluid enters the chamber A in the cylinder 1 through nipple 20, displaces the ring 6 in the direction of the plug 2 and flows through the annular clearance 54a between the ends of the projection 102 on the plug and shoulder 54 of the casing of the cylinder 1, thence through an annular clearance 52 and radial cuts 53 to the chamber B. When the pressure in the chambers A, B reaches a predetermined limit set by the properties of the springs 5, 55, the compound piston is displaced in a direction away from the plug 2, the ring 6 disconnecting the chamber A and annular clearance 54a, thereby cutting off the chamber B and its respective outer circuit. The pressure in the circuit connected with the shoe operating cylinders is henceforth reduced with respect to the pressure transmitted by the master cylinder to the chamber A.

A further increase in pressure in the chamber A effects the compensating stroke of the compound piston which is again slightly displaced in the direction of the plug 2. This displacement is just sufficient to allow flow of the larger liquid volume required in the circuit connected with the shoe operating cylinders. The liquid flows at this stage as a matter of fact merely by oozing, so that the chambers A, B are again disconnected. Of course, the above described movements of the compound piston can be repeated several times at this operational stage of the device and are in the form of slight oscillations rather than actual strokes.

On release of pressure in the chamber A the liquid flowing back from the shoe operating cylinders displaces the ring 6 in the direction of a shoulder 4a on the piston head 4 and flows to the chamber A through an orifice 24 bored in the shoulder 4a.

Figure 9:
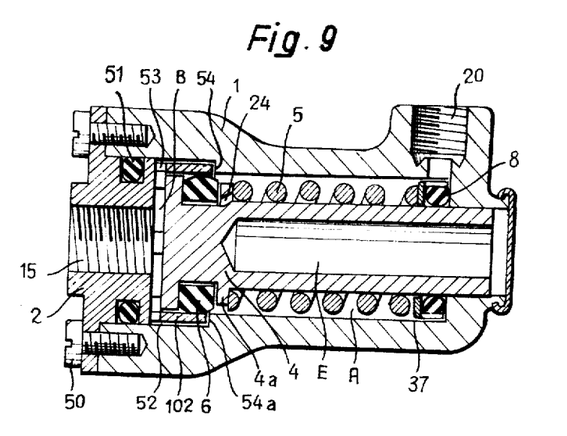
FIGURE 9 is a longitudinal sectional view of a modification of FIGURE 8.

The embodiment shown in FIGURE 9 differs from the one just described by the absence of the spring 55 and its checking means at the end of the cylinder 1 remote from the plug 2. However, this construction is identical in operation with the construction described above.

Figure 10:
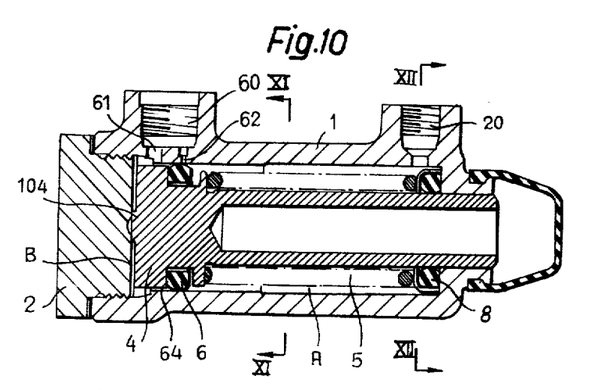
FIGURE 10 is a longitudinal sectional view of the device according to a further embodiment.
Figure 11:
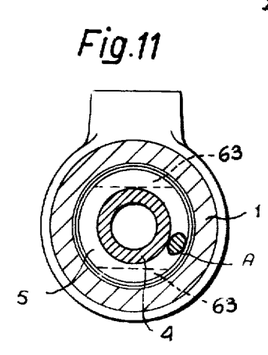
FIGURE 11 is a sectional view on line XI—XI of FIGURE 10.
Figure 12:
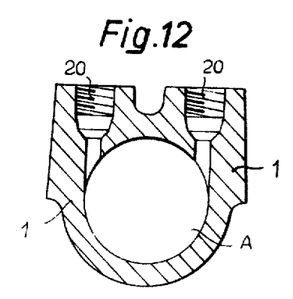
FIGURE 12 is a sectional view on line XII—XII of FIGURE 10.
Figure 13:
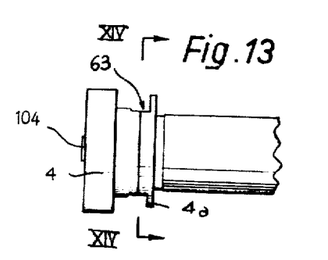
FIGURE 13 is a side view of a constructional detail of the device according to FIGURE 10.
Figure 14:
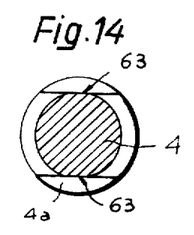
FIGURE 14 is a sectional view on line XIV—XIV of FIGURE 13.

The embodiment shown in FIGURES 7 and 10 differs from the embodiments according to FIGURES 8 and 9 above all because the low pressure chamber B connects with the outside by a through bore 61 in a threaded nipple 60 integral with the cylinder. When the compound piston 4 is in its inoperative position shown in FIGURE 3, the nipple 60 moreover connects with the chamber A through a compensating orifice 62, the outlet of which towards the inside of the cylinder 1 is somewhat offset in a direction away from the plug 2 with respect to the top of the outer periphery of the sealing ring 6. Connection of an annular clearance 23 between the inner wall of the ring 6 and the bottom of its respective seat formed in the head of the compound piston 4, with the high pressure chamber A is constantly afforded by the provision of two transverse millings 63 (see FIGURES 11, 13, 14) in the shoulder 4a which forms one of the side walls of the seat for the ring 6.

Operation of the embodiments described with reference to FIGURES 8 and 9 as well as the embodiment described with reference to FIGURES 10 to 14 in use as hydraulic pressure boosters is identical with operation of the devices described with reference to FIGURES 1 to 7.

Figure 15:
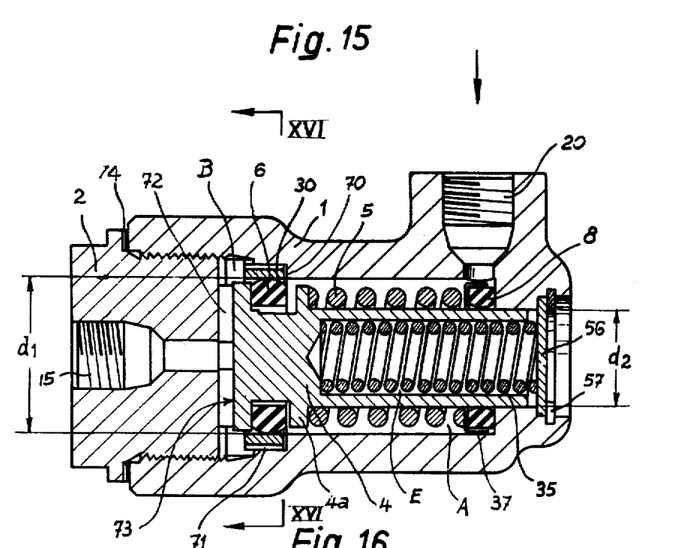
FIGURE 15 is a longitudinal sectional view of a further embodiment.
Figure 16:
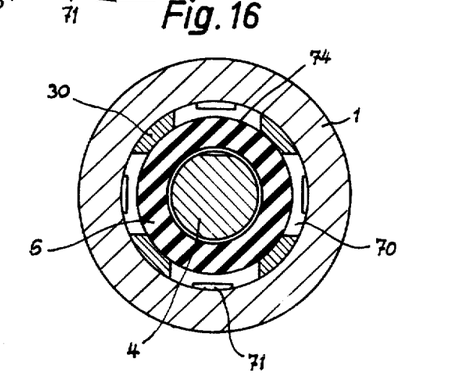
FIGURE 16 is a cross sectional view on line XVI—XVI of FIGURE 15, FIGURES 17 to 20 are on an enlarged scale longitudinal sectional views of four embodiments of a constructional detail of the improved device.

In the embodiment shown in FIGURES 15 and 16 a cylinder 1 has movable therein a compound piston 4, the small diameter section of which is guided in a bore of a diameter $d_2$ and connects at one end the cylinder bore with the outside. The large diameter or head portion of the piston 4 is guided in turn in a bushing 30 having a bore of diameter $d_1$ fitted in a seat formed within the cylinder 1 in proximity to the plug 2 which closes the bore of the cylinder 1 on the remote side of the hole in which the small diameter section of the piston 4 is guided. The bushing is formed at its end opposite the plug 2 with four radial cuts 70 arranged crosswise each connecting with a longitudinal peripheral groove 71 extending to the end of the bushing opposite the end in which the four abovementioned radial cuts are formed.

B denotes the low pressure chamber connecting with a threaded nipple 15 in the plug 2 having radial projections 72 facing the piston 4, which prevent contact between the face 73 of the piston head and the adjacent face of the plug 2. Of course the projections 72 can be integral with the piston head instead of with the plug 2.

The chamber A houses a reaction spring 5 interposed between a shoulder 4a on the head of the compound piston 4 and a cup 37 acting on a resilient sealing ring 8 mutually sealing the small diameter section of the piston 4 and the seat in which it is guided.

The head of the compound piston 4 is formed with an annular seat housing a sealing ring 6 which is likewise annular. The outer periphery of the sealing ring 6 which is of arcuate cross sectional shape contacts the inner wall of the bushing 30. The bore of the ring 6 is larger than the diameter of the bottom of the annular groove housing the ring, the axial thickness of the ring being smaller than the axial length of the groove. An annular clearance 23 between the inner wall of the ring 6 and the bottom of the abovementioned groove constantly connects with the high pressure chamber A through a transverse milling 74 (FIGURE 2) in the bottom of the groove seating the ring 6.

The milling 74 reduces the thickness of part of the shoulder 4a.

The plug 2 is screwed into the casting 1 of the cylinder and seals the cylinder through the sealing ring 74.

The hole E formed in the piston houses an auxiliary spring 5. The latter bears on the side opposite the head of the piston 4 on a disc 5 positioned by an expansible ring 57. Springs 5, 55 normally hold the piston 4 pressed against projections 72 on the plug 2.

When the device is employed for reducing pressure, operation is as follows. A nipple 20 is connected with the outlet from the master cylinder (not shown) and a nipple 15 is connected to the shoe operating cylinders. Therefore, the fluid entering the chamber A in the cylinder 1 through the nipple 20 displaces the ring 6 in the direction of the plug 2 and flows through the radial cuts 70 and peripheral grooves 71 in the bushing 30 to the chamber B. When the pressure reaches in the chambers A, B a limit predetermined by the properties of the springs 5, 55, the compound piston 4 moves in a direction opposite the plug 2 and the ring 6 disconnects the chamber A and radial cuts 70, thereby shutting off the chamber B and its outer circuit.

The pressure in the circuit connected with the shoe operating cylinders is henceforth reduced with respect to the pressure transmitted by the master cylinder to the chamber A. A further increase in pressure in the chamber A effects the compensating stroke of the compound piston which is again slightly moved in the direction of the plug 2. This movement is just sufficient to let through the larger liquid volume required in the circuit connected with the operating cylinders. The liquid flows at this stage merely by oozing, so that the chambers A, B are again disconnected. Of course, the above described movements of the compound piston can be repeated several times at this stage of operation of the device and are in the nature of slight oscillations rather than actual strokes.

On release of pressure in the chamber A the liquid flowing back from the brake shoe operating cylinders moves the ring 6 in the direction of a shoulder 4a on the head of the piston 4 and flows to the chamber A through a cut 74 formed in the bottom of the groove seating the ring 6.

When the above described device is employed as a hydraulic pressure booster its operation is identical with the operation of the devices shown in FIGURES 1 to 7.

Essential advantages afforded by the improved device over prior constructions are as follows:

(1) Greater simplicity in construction, cheaper manufacture and upkeep,
(2) Smaller size,
(3) Quicker and improved bleeding,
(4) Improved reliability in operation and longer life,
(5) Quick supercharging of the device, hence shortening of the brake pedal stroke.

With regard to paragraph 5 above tests have shown that on braking cars equipped with the improved device, releasing the brake pedal and again braking, the pedal stroke becomes shorter, even less than one-half the stroke length previously required for braking. A study of this occurrence showed that on release of the brake after first braking, that is, during return of the compound piston after its compensating stroke, fluid freely flows around the floating ring from the low to the high-pressure chamber. The resulting excess fluid together with the fluid flowing back from the brake shoe operating cylinders is therefore discharged into the primary circuit (master cylinder) through its discharge orifice.

In all embodiments of the device described with reference to FIGS. 1 to 16 seal between the periphery of the smaller diameter portion of the cylinder and the end wall of the cylinder opposite the plug is effected by an O-ring acted upon by a washer or metal annular cup biased by a spring which can be the reaction spring itself.

Since the above seal is in practice of considerable importance to the operation of the device, a detailed description thereof will now be given with reference to FIGS. 17 to 20 of the drawings.

Figure 17:
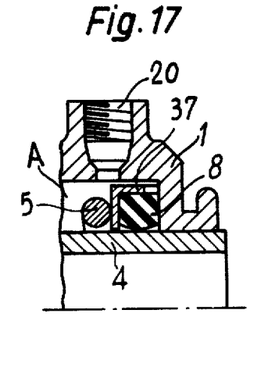
Figure 18:
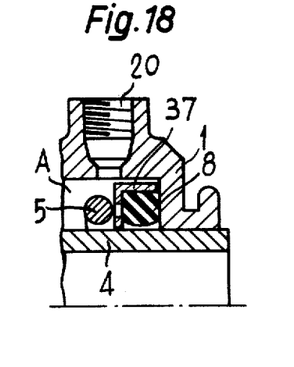
Figure 19:
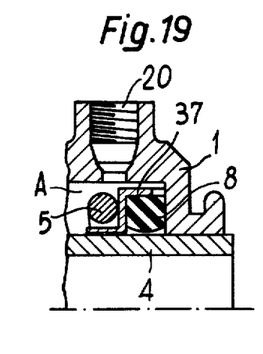

FIGS. 17 to 19 show that the sealing ring 8 is contained peripherally by a metal cup 37 having an axial bore through its base and having a depth slightly less than the axial thickness of the ring 8 and an outer diameter less than the diameter of the cylinder bore $d_2$.

The cup 37 and ring 8 are freely mounted on the plunger piston 4 and are compressed under the pre-load of the reaction spring 5 bearing axially on the cup base so that the rim 37a of the cup abuts against the annular end wall 1a of the cylinder, the ring 8 being thus slightly compressed axially in its cup container 37.

Thus the cup 37 also serves as a means to support the axial spring thrust, and to relieve the ring 8 thereof as otherwise the ring would be excessively compressed and deformed.

The cup 37 is vented to permit the hydraulic pressure taking effect on the ring body, and compressing it radially against the plunger piston 4. This, as will be shown later, ensures a seal under unfavorable conditions.

The ring bore is convex, that is it is formed with a surface of revolution having a curvilinear genetrix so that the apex of the curve initially and normally contacts the plunger and is spaced therefrom at the two ends. The convex ring bore reduces to a minimum the frictional resistance between the ring and the plunger piston with the reciprocal movements of the latter under pressure, and at the same time ensures adequate lubrication for the plunger piston.

The inner diameter of the cup 37 is approximately equal to the outer diameter of the ring 8 so that the latter is radially contained by the cup, and in the event of excessive swelling of the ring by the hydraulic fluid, and consequent radial expansion of the ring bore, the ring is always maintained in contact with the plunger.

As already intimated, the container cup 37 must be vented to permit hydraulic pressure to take effect on the ring 8 body (FIGS. 17, 18 and 19). In fact it has been found in actual practice, in the event the ring does not initially contact the plunger because of excessive wear, for example, without the said vents under pressure the ring 8 will not seal, permitting outflow of fluid and permitting the plunger piston 4 to extend to the end of its stroke. There will then be no delivery pressure whereas with the vents this is not the case.

In fact tests have demonstrated that when the ring 8 does not initially contact the plunger piston 4, as intimated above, the annular passage between the ring and piston must be choked in relation to that through the cup vents. When this is done the ring is compressed radially under hydraulic pressure against the piston to ensure a seal. The annular passage past the ring bore may be choked by reducing the axial bore of the cup base on the plunger piston 4 or by lengthening the bore (FIG. 19).

Figure 20:
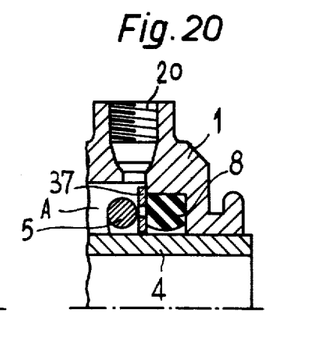

In practice it has been found that the freely mounted cup container 37 for the ring 8 is preferable to lodging the ring in an annular seat fashioned in the endwall 1a of the cylinder with a thrust washer 9 for the spring as illustrated in FIG. 20. In fact the cup is centered on the ring and plunger so that there is no tendency for the plunger to be scored by the cup base even when the bore thereon closely fits the plunger, whereas in the arrangement of FIG. 20 the thrust washer is not centered on the plunger, and scoring may take place in its reciprocal movements.

With the foregoing introductory remarks, the following test report is submitted to give substance to the remarks:

*Tests*

An elastic ring with a bore appreciably greater than the plunger piston diameter, that is with a free annular passage between the ring bore and the plunger piston, was mounted in a booster with a compound plunger piston and tested on the bench. With this ring under hydraulic pressure there would normally be a free passage for the fluid past the plunger.

*1st test.*—The ring as described above was mounted in the booster and an un-vented container cup. Under pressure it was found that fluid was expelled past the plunger, and the compound piston was extended to the end of its stroke. In other words, there was no seal even when the cup base bore fitted snugly on the plunger.

*2nd test.*—The same ring was mounted as above in a vented cup as in FIGS. 17, 18 and 19 and in this case under hydraulic pressure, there was initially a relatively slight seepage of fluid past the seal which was arrested with the increase of pressure and plunger piston extension. In this test it was established that the sealing was improved by reducing the diameter of the cup axial bore so as to fit closely on the plunger or by lengthening the cup bore as in FIG. 19. It is to be surmised however that provided the annular passage between the ring bore and the plunger is restricted in relation to the passage through the cup vents, the ring will seal on the plunger independently of the diameter of the cup bore on the plunger.

*3rd test.*—The same ring was mounted in an annular seat fashioned in the base of the cylinder with a thrust washer for the spring. With an unvented washer there was no seal even with a close fit of the washer on the plunger as in the case of the arrangement with the un-vented container cup. With a vented washer according to FIG. 20 the sealing characteristics were practically the same as with the vented cups of FIGS. 17, 18 and 19. However as already stated, the arrangement of FIG. 20 is not as good as with the independent cups because of difficulty of production and because the plunger is liable to be scored by the washer.

The ring seal as described above cannot be successfully replaced by a conventional sealing ring of cup-shape in cross section. In fact in motorized bench tests it was demonstrated that though sealing under pressure was good, an excessive amount of fluid seeped past the cupped seal during the return stroke of the plunger.

This test was made at 50 atmos. delivery pressure with an 8.5 mm. plunger stroke and with 1400 working cycles per hour. Under these conditions with the ring shown in FIGS. 17 to 20 there was a seepage of about 1 drop of fluid per 6000 working cycles in the plunger return stroke where as with the conventional cupped ring the seepage amounted to 1 drop of fluid for every 58 working cycles approximately. That is in 6000 working cycles there would be about 107 drops of seepage as contrasted with the 1 drop with the un-cupped sealing ring.

In the various constructions described with reference to the drawings the compound piston has two portions differing in diameter sliding in two cylindrical holes bored within the cylinder matching in diameter said two piston portions.

However, it will be obvious that an equivalent structure could be obtained by boring in the small diameter portion of the compound piston a cylindrical bore coaxial with the piston and slidably supporting it or a cylindrical projection on the plug, said projection being axially bored and carrying at its periphery a seal acting between the outer periphery of said projection on the plug and the inner periphery of the bore in the small diameter piston portion. In this case the inner diameter of said bore is considered as the small diameter piston portion.

In consideration of the above, the appended claims should be understood to include the case in which one of the cylindrical walls with which the piston cooperates comprises the outer surface of the axial projection on a plug closing the end of a constant diameter cylinder.

What we claim is:

1. A hydraulic pressure ratio changer for interposition in a pressure fluid line to form a part of that line between a fluid pressure source and a working point on the line, comprising a two-diameter piston having a section of large diameter and a section of small diameter, a cylinder for pressure ratio change operation surrounding and guiding said piston, said piston defining first and second axially spaced-apart chambers in said cylinder, one of said chambers being defined by the face of the large diameter section of the piston and the other by the opposite annular face of the piston disposed between its large and small diameter sections, one of said chambers being adapted to be connected to said fluid source and the other to said working point of the line when the cylinder is coupled in the fluid line, means defining a passageway connecting said first and second chambers being defined between the periphery of the large diameter section of the piston and the opposed cylinder wall for passing fluid directly through the cylinder, the periphery of said large diameter section of the piston being formed with an annular recess, a packing ring made of resilient material seated in said annular recess in the periphery of said large diameter section of the piston, said packing ring being dimensioned to be constantly in contact with the cylinder wall and having a smaller width and of a larger inner diameter than the width and bottom diameter of said annular recess, said passageway constantly connecting the portion of said recess lying between its inner surface and the inner wall of said packing ring with said chamber defined by said annular face of the piston, whereby said packing ring acts as a valve controlling the fluid flow across said passageway, a reaction spring constantly urging the piston towards the chamber defined by said large diameter face of the piston and said piston moving against the bias of said reaction spring only after the fluid pressure in the chamber defined by the annular face of the piston has attained a predetermined value to cause the packing to close said passageway whereupon the piston is brought into pressure ratio change operation and the packing ring suddenly reopens said passageway upon the piston beginning its return stroke after the fluid pressure in the fluid pressure source has been released.

2. A hydraulic pressure ratio changer as defined in claim 1, further comprising at least one radial port in the cylinder wall and communicating with said chamber defined by the large diameter face of the piston having an outlet in said chamber defined by the annular face of the piston, said outlet being so positioned that it is covered by said packing ring when the piston is in operative position but establishes communication between said first and second chambers when the piston is inoperative and the packing ring is fully displaced towards the side wall of said annular recess lying nearer the large diameter face of the piston.

3. A hydraulic pressure ratio changer as defined in claim 1 further comprising hydraulic piston braking means disposed in the chamber defined by the annular face of the piston, said braking means assisting the action of the reaction spring during the protractile stroke of the piston and said braking means comprising a partition dividing said last-named chamber into two parts and providing restricted communication between the two parts.

4. A hydraulic pressure ratio changer as defined in claim 1, further comprising a tumbler-shaped element disposed inside the cylinder near the end of the latter opposite said chamber defined by the greater diameter piston face, said tumbler-shaped element receiving and guiding the end section of the lower diameter portion of the piston, the latter being hollow and enclosing a first reaction spring interposed between the piston and the tumbler-shaped element, sealing means for sealing the space enclosing said first spring from the second chamber defined by said annular face of the piston, a second reaction spring disposed in said second chamber, said second reaction spring holding in position said sealing means for sealing the second chamber from the space in which said first reaction spring is disposed.

5. A hydraulic pressure ratio changer as defined in claim 1, further comprising an elastic sealing ring adapted to seal against fluid passage under pressure around the part of smaller diameter of the compound piston and the bore in the cylinder end wall, means for containing the ring axially and radially, a reaction spring for the piston and means for supporting the axial thrust of said last-named reaction spring to relieve the ring therefrom, said supporting means being formed with an axial bore and being vented to permit the hydraulic pressure to be delivered to the ring body, the ring and supporting means for the spring being freely mounted on the compound piston, and the piston having a relatively close sliding fit in the axial bore of the spring supporting means.

6. A hydraulic pressure ratio changer as defined in claim 5 wherein the spring supporting means is defined by a metal cup having an axial bore through its base, the inner cup diameter being approximately equal to the outer diameter of the ring, and the cup depth being slightly less than the axial thickness of the ring which is contained by the cup, the spring bearing axially on the cup base.

7. A hydraulic pressure ratio changer as defined in claim 6 wherein the cup has an axial extension so that the axial bore of the cup is lengthened to choke the annular passage for the fluid between the cup and the piston under pressure.

8. A device as defined in claim 5 wherein the sealing ring has a bore which is convex and is formed with a surface of revolution having a curvilinear generatrix with the apex of the generatrix normally contacting the compound piston and the two ends thereof being spaced from the piston.

References Cited in the file of this patent

UNITED STATES PATENTS

| | | |
|---|---|---|
| 2,272,360 | Swift | Feb. 10, 1942 |
| 2,399,269 | Vickers | Apr. 30, 1946 |
| 2,408,513 | Gunderson | Oct. 1, 1946 |
| 2,463,173 | Gunderson | Mar. 1, 1949 |
| 2,561,009 | Byers et al. | July 17, 1951 |
| 2,737,777 | Krusemark | Mar. 13, 1956 |
| 2,808,703 | Baldwin | Oct. 8, 1957 |
| 2,813,399 | Valentine | Nov. 19, 1957 |

UNITED STATES PATENT OFFICE
CERTIFICATE OF CORRECTION

Patent No. 3,088,285                                                  May 7, 1963

Dante Giacosa et al.

It is hereby certified that error appears in the above numbered patent requiring correction and that the said Letters Patent should read as corrected below.

In the grant, lines 2 and 3, for "assignors, by direct and mesne assignments, to Fiat Societa per Azioni, of Turin, Italy," read -- assignors, by direct and mesne assignments, of one-half interest to said Baldwin and of one-half interest to Fiat Societa per Azioni, of Turin, Italy, --; line 12, for "Fiat Societa per Azioni, its successors" read -- Philip S. Baldwin, his heirs or assigns, and Fiat Societa per Azioni, its successors --; in the heading to the printed specification, lines 4 and 5, for "assignors, by direct and mesne assignments, to Fiat Societa per Azioni, Turin, Italy" read -- assignors, by direct and mesne assignments, of one-half interest to daid Baldwin and of one-half interest to Fiat Societa per Azioni, Turin, Italy --.

Signed and sealed this 24th day of December 1963.

(SEAL)
Attest:
ERNEST W. SWIDER

Attesting Officer                                 EDWIN L. REYNOLDS
                                                          Acting Commissioner of
                                                                         Patents